Patented May 27, 1952

2,598,530

UNITED STATES PATENT OFFICE 2,598,530

ENTERIC COATED PYRANISAMINE

Walter C. Gakenheimer, Westfield, N. J., assignor to Merck & Co., Inc., Rahway, N. J., a corporation of New Jersey No Drawing. Application July 12, 1949, Serial No. 104,385

8 Claims. (Cl. 167—82)

This invention relates to the preparation of therapeutic material and, more specifically, to specially coated pyranisamine tablets and to a method for the preparation of these tablets.

Pyranisamine, i. e. the compound N-p-methoxy-benzyl-N'-N'-dimethyl-N-α-pyridyl-ethylenediamine, is an anti-histaminic compound which has proved to be of great value in the symptomatic treatment of many allergic disorders. Clinically, pyranisamine is extremely effective in the treatment of hay fever, urticaria (acute and chronic), angioneurotic edema, vasomotor rhinitis, allergic drug reactions and atopic dermatitis. Some of the most impressive results achieved in anti-histaminic therapy were demonstrated in the alleviation from adverse effects offered to hay fever sufferers and exhaustive studies indicate that pyranisamine is the most potent of the anti-histaminics currently available. It is remarkable to note in successful cases that significant amelioration of symptoms usually occurs within 20–45 minutes after taking the first dose. Pyranisamine is administered in the form of acid salts, preferably the maleate salt—the acid maleate of N-p-methoxy-benzyl-N'-N'-dimethyl-N-α-pyridyl-ethylenediamine—which is represented by the following formula:

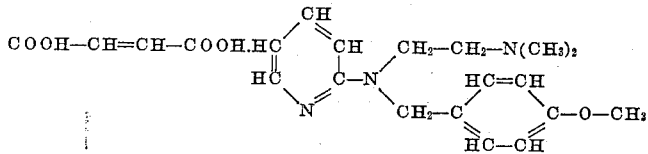

This compound, pyranisamine maleate, is a white crystalline water-soluble powder possessing a bitter taste, a melting point of 100–101° C. and a molecular weight of 401.45.

Despite its effectiveness, there are some disadvantages associated with the use of this anti-histaminic substance. Practical considerations limit the administration of this drug to small doses, a single dose lasting for only a relatively short period of time, i. e. 3–4 hours, thereby requiring 3–4 doses daily. Another disadvantage is the discomfort due to side effects caused by the administration of this anti-histaminic.

It has now been discovered that marked symptomatic relief is provided for symptoms of hay fever and hyperesthetic rhinitis by the administration of a unit dose of pyranisamine completely enveloped by a relatively thin film of a polycarboxylic acid ester of cellulose and in this form the drug has proved to be more effective when taken in smaller doses and at less frequent intervals than any coated pyranisamine tablet heretofore used. On compounding this preparation in tablet form, a patient would actually have to take only ½ of the number of tablets previously prescribed. In using the new and improved tablet, clinical studies indicate that a smoother longer-continued action is observed and, likewise, a relatively low incidence of undesirable side effects is noted.

In accordance with my invention, a specially coated pyranisamine tablet possessing a prolonged anti-histaminic action is prepared by applying a relatively thin coating of a polycarboxylic acid ester of cellulose to a pyranisamine tablet prepared by conventional means and then, if desired, applying thereto rapidly dissolving coatings of sugar.

The polycarboxylic acid ester of cellulose used as a coating material in the present invention is prepared in the manner described by U. S. Patent No. 2,196,768 and is preferably a mixed ester containing acetyl and phthalyl radicals, each of the phthalyl radicals having one uncombined carboxyl group, the total amount present of free carboxyl being about 9–11% by weight.

Undoubtedly the most distinctive feature of this tablet is its effective and prolonged anti-histaminic action. Actually, while the outer sugar-covered portion of the tablet dissolves immediately upon ingestion, complete decomposition of the inner coating occurs in the small intestine. Although it would be normally expected that this specially coated pyranisamine tablet would not relieve the discomfort associated with disorders of this nature until a few hours after it is taken, actual relief is noted in a relatively short period of time, i. e. within 30 minutes. The result obtained compares very favorably with the conventional sugar-coated tablet wherein alleviating effects in patients are observed generally within 20 minutes after administration of a dose of this drug. This surprising and highly unexpected result can be explained by the fact that some of the anti-histaminic material present in the tablet is set free prior to entry of the tablet into the small intestine and that the tablet disintegrates very slowly.

The unusually rapid action of the new coated tablet may possibly be due to an ion exchange effect wherein secretions present in the highly acid medium of the stomach penetrate the tablet and release pyranisamine through the coating or film of cellulose acetate hydrogen phthalate without any actual breakdown of the coating. When the tablet reaches the small intestine, further release of pyranisamine occurs, as the new coating breaks down completely due to the action of the secretions present in the intestine. Complete breakdown or disintegration of the tablet requires a considerable period of time, however, as indicated by the fact that the drug present in the single tablet will give relief and exert its antihistaminic activity over an extended period of time varying from 6 to 12 hours. By comparison the relief afforded by the conventional sugar-coated tablet lasts only up to 3 or 4 hours.

Certain of the side reactions normally obtained by the administration of this drug are undoubtedly due to local irritant action on the gastric mucosa and others to the amount of drug actually circulating in the blood. By virtue of this special coating, only a relatively small amount of medication actually comes in contact with the gastric mucosa. Likewise, as the amount of drug ingested is reduced considerably, the amount circulating is the blood is greatly diminished.

The specially coated pyranisamine tablets may be prepared by conventional means with a wide range of choice as to appropriate excipients, disintegrating agents and other necessary ingredients. In a preferred embodiment of this invention, a salt of pyranisamine such as pyranisamine maleate, together with such conventional fillers as lactose, corn starch and sucrose are thoroughly mixed together and the mixture is then passed through a sieve of a fine mesh. The powder thus obtained is then moistened with a typical binder, e. g. an aqueous mucilage solution of acacia and the moist mixture is granulated by forcing it through a sieve of predetermined size, preferably about 10 mesh. The granules obtained in this manner are dried by heating at a temperature of about 40° C. A small amount of a dried finely powdered lubricant such as magnesium stearate is added to the granulated material in order to facilitate subsequent compression of said material into tablet form. The granules are then compressed by deep-cup punches into tablets weighing about 0.13 gram each.

The cellulose ester coating material such as cellulose acetate hydrogen phthalate is dissolved in a suitable solvent, preferably Cellosolve, by heating on a steam bath. The resulting viscous solution is cooled to room temperature and, accompanied by continuous stirring, chloroform is gradually added. The pyranisamine tablets previously prepared are placed in a revolving coating pan and the first coating is applied by adding small portions of the cellulose acetate hydrogen phthalate, accompanied by thorough mixing. After each addition, the coating is dried by blasts of warm air. Following the application of this coating, the tablets are subjected to a blast of warm air for a period of time of about 30 minutes. The resulting coating of cellulose ester should be about 0.002 to 0.02 inch thick.

If desired, a sweet taste may be imparted to the tablets by applying an outer sugar coating. Such outer coating is applied to the tablets by adding a gelatin-sucrose solution in predetermined portions at a temperature of about 60° C. to the revolving pan containing the tablets. Di-calcium phosphate is used as a dusting powder to aid in the preparation of a smooth coating. This coating is thoroughly dried by circulating warm air over the tablets for a period of time of about 30 minutes.

The outer final coating is smooth and hard and is obtained by applying the sucrose syrup and di-calcium phosphate dusting powder alternately to the revolving tablets. The unpleasant taste of the pyranisamine is masked by the use of sucrose coating. The aforementioned coating materials are gradually added until the weight of the finished tablet is about 0.25 gram. The coated tablets are then polished by conventional means.

The following example illustrates the method of manufacturing a specially prepared pyranisamine tablet but this example is given by way of illustration and not of limitation.

*Example*

The following ingredients are used for making 20,000 specially coated pyranisamine tablets of 50 mg. each.

| | |
|---|---|
| Pyranisamine maleate (#20 powder) __g__ | 1000.0 |
| Lactose _____g__ | 664.0 |
| Corn starch (fine powder) _____g__ | 412.0 |
| Sucrose (fine powder) _____g__ | 400.0 |
| Magnesium stearate _____g__ | 26.0 |
| Talc _____g__ | 52.0 |
| Acacia (as 320 cc. of 10% mucilage) ___g__ | 32.0 |
| Cellulose acetate hydrogen phthalate (10.4% free—COOH_____g__ | 174.0 |
| Cellosolve _____cc__ | 300.0 |
| Chloroform _____cc__ | 600.0 |
| 3% gelatin—40% sucrose solution____cc__ | 200.0 |

Simple syrup } of each, sufficient quantity to make weight of finished tablet = 0.2500 g. (approximately 100 g. of each)
Dicalcium phosphate The Neo-Antergan maleate, lactose, corn starch and sucrose are thoroughly mixed and then sifted through a #40 mesh stainless steel sieve. The resulting powder is moistened with 320 cc. of a 10% aqueous mucilage solution of acacia. Approximately 50 cc. of water is added to the dampened mass and after thorough mixing the mass is forced through a #10 mesh stainless steel sieve. The moist granules are dried at a temperature of 40° C. overnight and the resulting granules are pressed through a #16 mesh stainless steel sieve. 60 grams of fines obtained by sifting the granules on a #40 mesh sieve are mixed with magnesium stearate and talc and this material is sifted through a #40 mesh sieve onto the granules.

After thorough mixing, the granules are compressed into tablets weighing 0.1293 gram each by the use of $\frac{9}{32}$" deep-cup punches.

The cellulose acetate hydrogen phthalate is dissolved in the Cellosolve by heating on a steam bath at a temperature of about 100° C. The viscous solution thus obtained is cooled to room temperature and, while stirring continuously, chloroform is gradually added. The 20,000 compressed tablets are then placed in a revolving coating pan and the first coating is applied by the addition of the cellulose acetate hydrogen phthalate solution in approximately 50 cc. portions. The addition of this material is accompanied by thorough mixing. Meanwhile, a blast of warm air is applied after each addition for a period of time sufficient to dry the coating. After all of the cellulose acetate hydrogen phthalate solution has been added, the coated tablets are subject to a warm air blast for a period of time of about 30 minutes. By actual measurement the resulting coating on a tablet thus prepared varies from about 0.004 to 0.009 inch in thickness depending on the portion of the tablet, the coating being thicker on the edge of the tablet than on the face of the tablet.

A second coating is applied by adding the gelatin-sucrose solution in approximately 50 cc. portions at a temperature of about 60° C. to the tablets located in the revolving pan. The dicalcium phosphate is used as a dusting powder and is of considerable aid in obtaining a smooth coating. This coating is thoroughly dried by circulating warm air over the revolving tablets for about 30 minutes.

The outer sugar coating is obtained by applying the sucrose syrup and dicalcium phosphate dusting powder alternately to the revolving tablets, obtaining thereby a smooth and hard coating. These coating materials are gradually added until the weight of the finished tablet is 0.2500 gram. The coated tablets are then polished by conventional means.

The final products were assayed by carefully powdering 10 tablets and then quantitatively transferring them with distilled water into a 500 cc. volumetric flask. The mixture was diluted to 500 cc. with distilled water and shaken vigorously for several minutes. A 10 cc. aliquot was removed and diluted to 500 cc. with distilled water. After thorough mixing, the solution was filtered through a fine sintered glass filter (rejecting the first 25 cc. of filtrate). The optical density of this solution was measured with a Beckman spectrophotometer at a wave length of 244 millimicrons using a one cm. quartz cell.

Optical density $(d) \times 59.5 =$ mg. pyranisamine maleate per tablet.

The specially coated pyranisamine maleate tablets disintegrate within 40 minutes when tested by immersion in artificial intestinal juice (at a temperature of about 38° C.) and accompanied by gentle agitation while the tablets are lying on a #8 mesh screen.

The durability of these tablets was indicated by placing 10 tablets in a 100 cc. glass-stoppered cylinder and then inverting this cylinder 30 times during a one minute period. On examination, it was found that the tablets were neither chipped nor fractured after this treatment.

Various changes and modifications may be made in carrying out this invention without departing from the spirit and scope thereof. Insofar as these changes and modifications are within the scope of the appended claims, they are to be considered as part of this invention.

I claim:

1. An oral therapeutic remedy providing prompt and long-extended anti-histaminic action, comprising a unit dose of an acid salt of pyranisamine completely enveloped by a thin film of a polycarboxylic acid ester of cellulose.

2. An oral therapeutic remedy providing prompt and long-extended anti-histaminic action, comprising a unit dose of an acid salt of pyranisamine completely enveloped by a thin film of cellulose acetate hydrogen phthalate.

3. An oral therapeutic remedy providing prompt and long-extended anti-histaminic action, comprising a unit dose of an acid salt of pyranisamine completely enveloped by a thin film of cellulose acetate hydrogen phthalate, said cellulose acetate hydrogen phthalate having a free carboxyl content of about 9–11%.

4. An oral therapeutic remedy providing anti-histaminic action effective within about 30 minutes after administration and continuing in effectiveness for a period of about 6 to 12 hours, said remedy comprising a unit dose of an acid salt of pyranisamine completely enveloped by a thin film of cellulose acetate hydrogen phthalate approximately 0.002 to 0.02 inch thick.

5. A tablet providing a prompt and prolonged anti-histaminic effect together with a low incidence of side reactions, said tablet comprising a unit dose of pyranisamine maleate completely enveloped by a thin film of a polycarboxylic acid ester of cellulose.

6. A tablet providing a prompt and prolonged anti-histaminic effect together with a low incidence of side reactions, said tablet comprising a unit dose of pyranisamine maleate completely enveloped by a coating of cellulose acetate hydrogen phthalate.

7. A tablet providing a prompt and prolonged anti-histaminic action effective within about 30 minutes and continuing in effectiveness for a period of about 6–12 hours, said tablet comprising a unit dose of pyranisamine maleate completely enveloped by a thin film of cellulose acetate hydrogen phthalate approximately 0.002 to 0.02 inch thick.

8. A tablet providing a prompt and prolonged anti-histaminic effect together with a low incidence of side reactions, said tablet comprising a unit dose of pyranisamine maleate completely enveloped by a coating of cellulose acetate hydrogen phthalate, said cellulose acetate hydrogen phthalate having a free carboxyl content of about 9–11%.

WALTER C. GAKENHEIMER.

REFERENCES CITED

The following references are of record in the file of this patent:

UNITED STATES PATENTS

| Number | Name | Date |
|---|---|---|
| 2,196,768 | Hiatt | Apr. 6, 1940 |

OTHER REFERENCES

Clinical Medicine, Sept. 1948, Advertising Section, page 16, 167–65J.

Bauer, J. A. P. A., Scientific Ed., Mar. 1948, pages 124–128, 167–82.5.

Haley, Ibid., Oct. 1948, pages 397, 400–401, 167–65J.